United States Patent [19]
Aleshin

[11] Patent Number: 5,160,822
[45] Date of Patent: Nov. 3, 1992

[54] METHOD FOR DEPOSITING MATERIAL ON THE TIP OF A GAS TURBINE ENGINE AIRFOIL USING LINEAR TRANSLATIONAL WELDING

[75] Inventor: Stephen Aleshin, Cincinnati, Ohio

[73] Assignee: General Electric Company, Cincinnati, Ohio

[21] Appl. No.: 701,403

[22] Filed: May 14, 1991

[51] Int. Cl.⁵ .............................................. B23K 26/00
[52] U.S. Cl. .......................... 219/121.64; 219/121.8; 219/121.82
[58] Field of Search .................. 219/121.63, 121.64, 219/121.6, 12.85, 121.65, 121.66, 121.82, 121.8

[56] References Cited

U.S. PATENT DOCUMENTS

| Re. 29,815 | 10/1978 | Gnanamuthu | 219/121 |
|---|---|---|---|
| 3,824,368 | 7/1974 | Locke | 219/121 |
| 4,409,462 | 10/1983 | Jahnke | 219/121 |
| 4,658,110 | 7/1987 | Miller et al. | 219/121 |
| 4,697,060 | 9/1987 | Izuwa et al. | 219/121 |
| 4,724,299 | 2/1988 | Hammeke | 219/121 |
| 4,725,708 | 2/1988 | Kawasaki et al. | 219/121.64 |
| 4,868,365 | 9/1989 | Farone et al. | 219/121.64 |
| 4,873,415 | 10/1989 | Johnson et al. | 219/121.64 |
| 4,942,285 | 7/1990 | Ishikawa et al. | 219/121.64 |
| 4,998,005 | 3/1991 | Rathi et al. | 219/121.83 |
| 5,038,014 | 8/1991 | Pratt et al. | 219/121.64 |

FOREIGN PATENT DOCUMENTS 63-224888 9/1988 Japan .

Primary Examiner—C. L. Albritton
Attorney, Agent, or Firm—Charles L. Moore, Jr.; Jerome C. Squillaro

[57] ABSTRACT

A method for depositing material on a tip of a gas turbine engine airfoil includes the steps of: selecting a linear principal weld path across the airfoil tip relative to an airfoil contour at the tip; selecting a weld bead stitch pattern to substantially completely cover the airfoil tip with the stitch pattern crisscrossing the linear principal weld path between opposite edges of the airfoil and advancing across the airfoil in the direction of the linear principal weld path; and depositing at least a first layer of tip material corresponding to the weld bead stitch pattern and the linear principal weld path by welding.

13 Claims, 4 Drawing Sheets

METHOD FOR DEPOSITING MATERIAL ON THE TIP OF A GAS TURBINE ENGINE AIRFOIL USING LINEAR TRANSLATIONAL WELDING

BACKGROUND OF THE INVENTION

The present invention relates to the manufacture and repair of gas turbine engine airfoils and, more particularly, to an improved method for depositing material on the tip of a gas turbine engine airfoil using linear translational laser welding to prevent airfoil tip recession during engine operation.

Gas turbine engine airfoils such as blades, blisks and the like are manufactured from materials designed to prevent creep and to be rupture resistant in high stress areas of the airfoil, such as the airfoil root, platform section and lower airfoil sections. The airfoil material is typically not necessarily compatible with the environmental conditions or wear properties necessary to prevent recession or shortening of the airfoil tip caused by oxidation, corrosion or contact between the airfoil tip and the stationary shroud of a gas turbine engine during engine operation. The main portion of the airfoil may also be covered with a thermal barrier coating to protect the airfoil from the operating environment while the airfoil tip is typically exposed and can be readily attacked by exhaust gases, salt, air and other corrosive elements in the fuel and air during engine operation.

To avoid tip recession caused by the operating environment, a material more resistant to the operating environment relative to the parent or base material of the airfoil is deposited, typically by laser welding, on the tip of the airfoil. Without such a tip, rapid recession of the airfoil would occur causing reduced engine performance and increased fuel consumption.

The modern, high heat and high stress resistant materials used to make gas turbine engine airfoils can be extremely difficult t weld. Additionally, the complex geometry of the contour of the airfoils can also cause difficulties in depositing the airfoil tip material by laser welding. Cracking can occur in the parent material of the airfoil during welding or during post-weld heat treatment because of the structure of the airfoil and its heat sink characteristics. The airfoils can have hollow interiors with passages formed therein to permit cooling air to be forced through these interior passages of the airfoil and out cooling holes in the surface of the airfoil to create cooling airstreams across the exterior surface of the airfoil during engine operation. Therefore, the heat sink characteristics of the airfoil will vary across the tip of the airfoil. The concentration of heat form the laser welding apparatus can cause damage to the airfoil in areas of the airfoil with poor heat sink characteristics. Residual stresses caused during the cooling of the deposited weld material can also cause cracking in the weld material and the airfoil base or parent material. Other types of cracking that can occur with laser welding include: cracking in the weld material which is typically associated with the cooling rate of the weld material; cracking in the airfoil base material which is typically associated with the grain boundaries of the base material; cracking in the fusion zone where the weld material and airfoil base material interface which can be caused by the cooling rate of the weld material and also the grain boundaries of the base material and also the interaction between the weld material and base material, particularly if the two are different materials; and cracking during post-heat treatment caused by strain aging of the materials or by restrained thermal expansion.

One method for depositing material on the tip 10 of an airfoil 12 is illustrated in FIG. 1A. A laser beam is focused on tip 10 from a laser welding apparatus 14, such as that described in U.S. Pat. No. 4,724,299 issued to Hammeke. The laser beam is focused through a nozzle 16 and the powdered material to be deposited is also forced by a carrier gas through nozzle 16 coaxially with the laser beam and the heat of the laser beam causes the powdered material to melt and fuse with the airfoil material on the tip 10. The periphery or contour of airfoil tip 10 is traced with laser welding apparatus 14 and weld material is thereby deposited on the periphery of the tip as represented by arrows 18. The deposited weld material may be a high heat, high stress resistant superalloy such as Inconel 738 or the like and airfoil 12 may be made of another high stress, high heat resistant metal alloy such as Rene 125 or the like. This method permits deposition of the weld material in a manner that closely follows that of the airfoil contour or provides build-up of the airfoil tip 10 which corresponds substantially to the near-net shape of the airfoil 12. This method, however, causes residual tensile stresses with force vectors as illustrated by arrows 20 in FIG. 1B which can cause massive weld material and base material cracking during deposition the weld material and also during post-weld heat treatment of airfoil 12.

Another method for depositing weld material on the tip end of an airfoil 12 is illustrated in FIG. 2A. This method can be used on those airfoils which are designed without cooling holes formed in the airfoil tip surface and where the weld material can be deposited across the entire surface area of tip 10. In this method, the principal weld direction substantially follows the airfoil contour at tip 10 as illustrated by arrows 22. The weld material is then deposited by laser welding apparatus 14 in beads 24 of weld material and following a stitch pattern which laterally transverses back and forth across airfoil tip 10 substantially perpendicular to the principal weld direction 22. Weld beads 24 are thus continuously advanced in this zig-zag fashion in the direction of principal weld direction 22. While FIGS. 2A and 2B show principal weld direction 22 as being from a trailing edge 26 of airfoil 12 to a leading edge 28 of airfoil 12, the principal weld direction 22 may be in the opposite direction depending upon the heat sink characteristics of airfoil 12 as determined by the hollow interior airfoil sections or baffles (not shown in FIG. 2A) through which cooling air flows during engine operation and out cooling holes 30 to form cooling airstreams, as indicated by arrows 32 in FIG. 2A, which flow over the exterior surface of airfoil 10 to provide exterior cooling during engine operation.

Because of the complex contour shape of some airfoils, depositing tip material in a principal weld direction that follows the contour of the airfoil can cause uneven heating by the laser welding apparatus 14 and nonsymmetrical deposition of the tip weld material. The deposited tip weld material, therefore, will not always substantially follow the contour or neat-net shape of the airfoil as closely as desired and additional processing steps, such as grinding or deposition of additional material may be required to provide a layer of tip material which has uniform height and that substantially follows the contour of the airfoil. An additional disadvantage of this method is that excess material can build up on the airfoil in area 34 (FIG. 2B) where the weld beads 24 of the stitch pattern are closer together because of the curvature of the airfoil and voids or spaces can exist between the weld beads 24 of the stitch pattern in area 36 on the convex surface of airfoil 12. This requires trial and error adjustment of the stitch pattern to eliminate voids or deposition of excess weld material to provide a uniform layer of tip material.

Another disadvantage of the method illustrated in FIGS. 2A and 2B is that, depending upon the airfoil geometry and the heat sink characteristics of the airfoil, the propagation of the heat front caused by the laser beam from laser welding apparatus 14 may not be predictable as the laser welding apparatus or airfoil is moved back and forth along the stitch pattern to deposit the weld material. The surface of airfoil 12 at point 38 may be relatively thin because of the channel or plenum (not shown in FIG. 2A) within the interior of airfoil 10 from which cooling air flows through cooling holes 30 to form airstreams 32. Heat from the laser beam could build up in a concentrated area, such as at point 38 on leading edge 28 of tip 10, causing melt-down of airfoil 12 at point 38.

A further disadvantage, of the method of following a curved principal weld direction 22 which substantially follows the contour of the airfoil, is depositing tip material on airfoils with a leading edge 28' which curve outwardly from a root 40 toward tip 10 as illustrated by the broken line in FIG. 2A. It is difficult to deposit successive layers of material which each follow the near-net shape of leading edge 28' of airfoil 10. The deposited weld material may simply just fall from the overhanging section of the airfoil, drip down leading edge 28' or form a bulbous mass at point 38 which does not continuously follow the contour of leading edge 38'.

SUMMARY OF THE INVENTION

It is accordingly a primary object of the present invention to provide a novel method for depositing material on the tip of a gas turbine engine airfoil which is not subject to the foregoing disadvantages.

It is another object of the present invention to provide a novel method for depositing material on the tip of a gas turbine engine airfoil which substantially follows the geometry of the airfoil and has a uniform height which significantly reduces the requirement for additional grinding operations or deposition of additional material.

It is a further object of the present invention to provide a novel method for depositing material on the tip of a gas turbine engine airfoil which has a uniform heat front to avoid damage to the airfoil during deposition of the material.

It is yet another object of the present invention to provide a method for depositing material on the tip of a gas turbine engine airfoil which is easily adaptable to different airfoil geometries without extensive modifications to the algorithm for controlling the movement of the airfoil relative to the laser welding apparatus during deposition of the airfoil tip material.

In accordance with the present invention, a method for depositing material on a tip of a gas turbine engine airfoil includes the steps of: selecting a linear principal weld path across the airfoil tip relative to an airfoil contour at the tip; selecting a weld bead stitch pattern to substantially completely cover the airfoil tip, the stitch pattern crisscrossing the linear principal weld path between opposite edges of the airfoil and advancing along the linear principal weld path across the airfoil; and depositing at leas a first layer of tip material corresponding to the weld bead stitch pattern and the linear principal weld path by welding.

These and other objects of the present invention, together with the features and advantages thereof, will become apparent form the following specification when read with the accompanying drawings.

DETAILED DESCRIPTION OF THE PREFERRED EMBODIMENT

Figure 3:
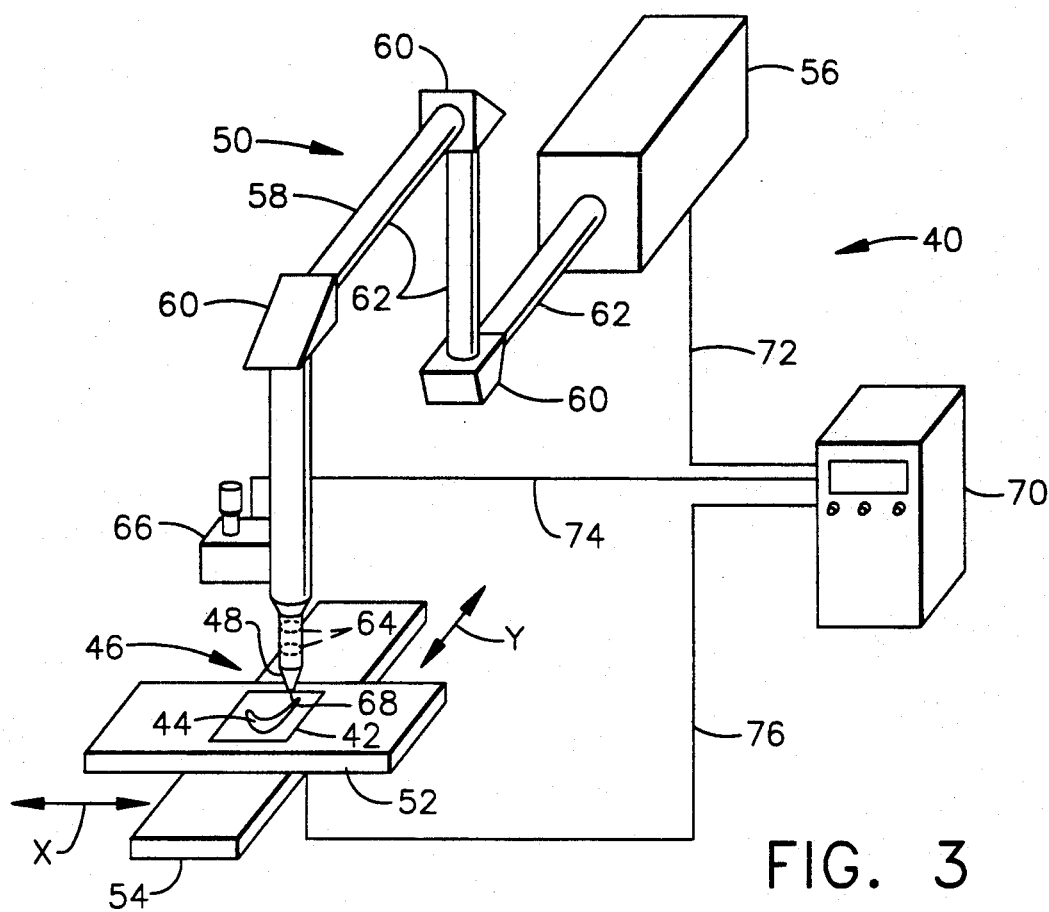
FIG. 3 is a diagram of the apparatus for depositing material on the tip of a gas turbine engine airfoil in accordance with the present invention.

Referring initially to FIG. 3, an apparatus 40 for depositing material on the tip of a gas turbine engine airfoil includes a fixture 42 for mounting and holding a gas turbine engine airfoil 44 during deposition of the tip material. The fixture 42 is further attached to a positioning system 46 for controlling the motion of the tip of airfoil 44 relative to a nozzle 48 of a laser welding apparatus 50. Positioning system 46 includes two transversely mounted tables 52 and 54 which are mounted for movement of airfoil 44 relative to nozzle 48 by servo motors (not shown) along two linear axes of motion as indicated by directional arrows X and Y in FIG. 3. Positioning system 46 is known in the art and may be a Unidex 16 as manufactured by Aerotech, Inc., or the like.

Laser welding apparatus 50 includes a laser source 56, such as a pulse or continuous wave (CW) $CO_2$ laser, YAG laser or the like. A laser beam delivery system 58 for safely delivering the high powered laser beam from source 56 to nozzle 48 may include a series of right angle reflective mirrors 60 interconnected by optical conduits 62 or a fiber optic beam delivery system may be used. Laser delivery system 58 basically includes known optical components and may differ from that shown in FIG. 3 depending upon the physical location of laser source 56 and positioning system 46.

Laser welding nozzle 48 is known in the art and may be a nozzle assembly such as that described in U.S. Pat. No. 4,724,299 which is incorporated herein by reference. Nozzle 48 includes optics 64 for focusing the laser beam generated by source 56 onto the tip of airfoil 44 in a spot size having a diameter between about 0.01" and about 0.05". Nozzle 48 further includes a powder feed system 66 for delivering a powdered metal, powdered ceramic or the like to the tip of nozzle 48 for deposition of the powdered material to the tip of airfoil 44 by laser welding. Nozzle 48 is structured so that the powdered material exits the end opening 68 at the tip of nozzle 48 in a uniform stream concentrically surrounding the laser beam also exiting end opening 68 of nozzle 48. The energy form the laser beam will cause the powdered material to melt and fuse onto the tip of airfoil 44 as the end opening 68 of nozzle 48 moves across the surface of airfoil tip 44.

While the present invention has been described using a laser welding apparatus 50, any welding-type device, such as a plasma transferred arc (PTA) welding device with a powder feed system 66 or the like, which can deposit a very narrow bead of weld material having a width of about 0.1" or less could be used as well.

Tip material deposition apparatus 40 further includes a computer numerical control (CNC) 70 which controls the laser welding operation and permits selection of some laser welding parameters. CNC controller 70 may be connected to laser source 56 by a communications link 72 to control the power of the laser beam generated as a function of the tip material being deposited, the parent material from which the airfoil is manufactured and the heat sink properties of airfoil 44. The laser power may be between about 200 watts and about 1,000 watts. CNC controller 70 may also be interconnected to powder feed system 66 by a communications link 74 to control the powder feed rate as a function of the transverse speed of airfoil 44 and the laser power or power density during deposition of the tip material. Typically, the powder feed rate and power density remain constant during deposition of the tip material. The powder feed rate may be between about 0.5 and about 10 grams per minute (gpm) and the transverse speed of airfoil 44 may be about 2 to about 50 inches per minute (ipm). CNC controller 70 is further interconnected to positioning system 46 by communications link 76 t control the transverse speed and direction of movement of airfoil 44 during deposition of tip material.

CNC controller 70 may, therefore, permit control and selection of some laser welding parameters such as the laser power or power density, frequency and pulse duration of the laser beam, powder feed rate, transverse speed of the airfoil and flow rate of the carrier gas for the powder. Other welding parameters that may be selected include the nozzle orifice size, granular size of the powder and the beam mode or distribution of power within the laser beam by changing the optical elements 64 within nozzle 48.

Figure 1A:
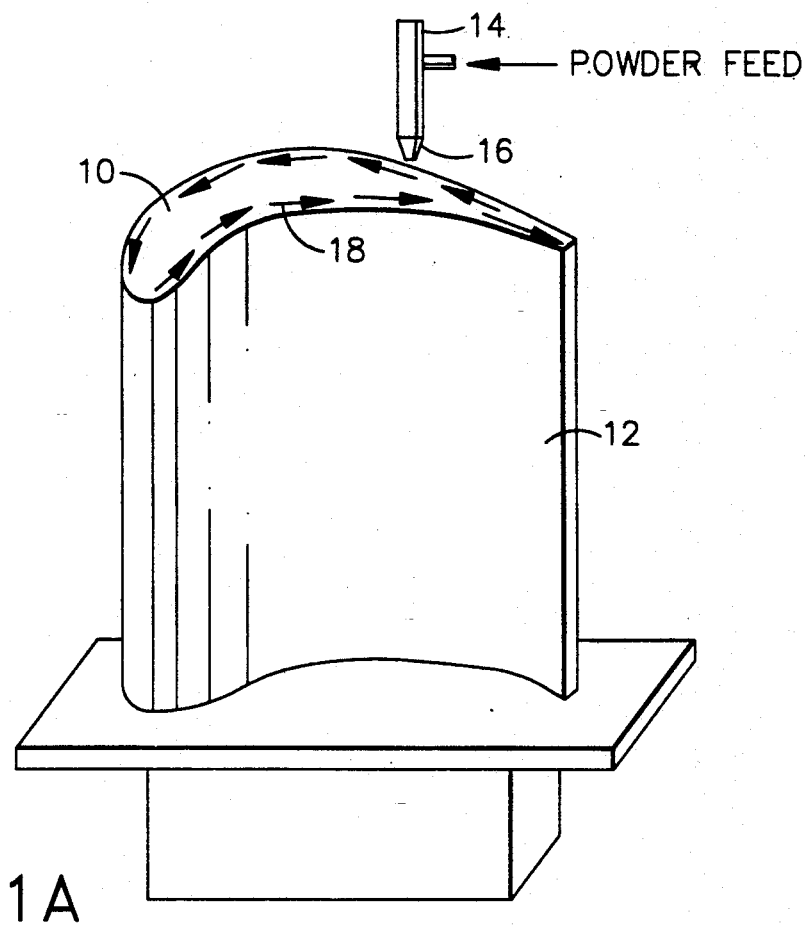
FIG. 1A is a perspective view of a gas turbine engine airfoil illustrating a prior art method for depositing airfoil tip material.
Figure 1B:
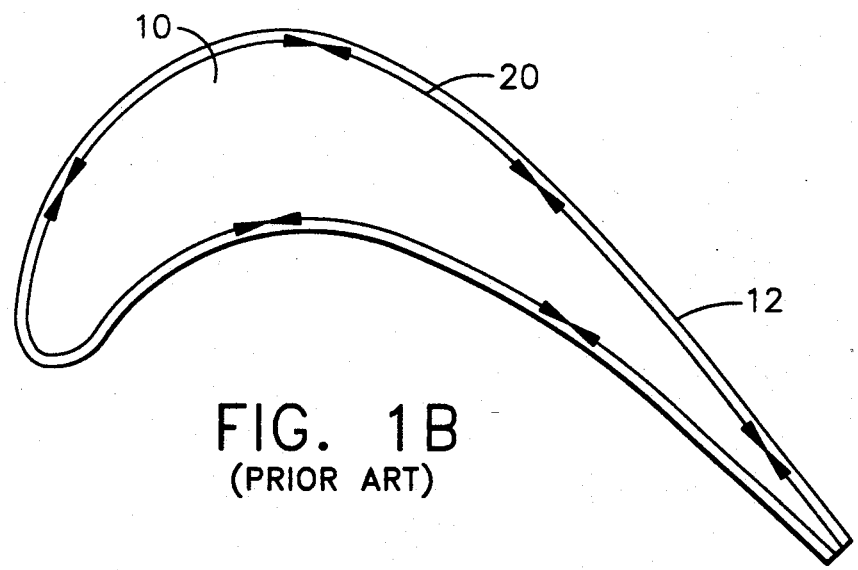
FIG. 1B is a top view of the airfoil of FIG. 1A.
Figure 2A:
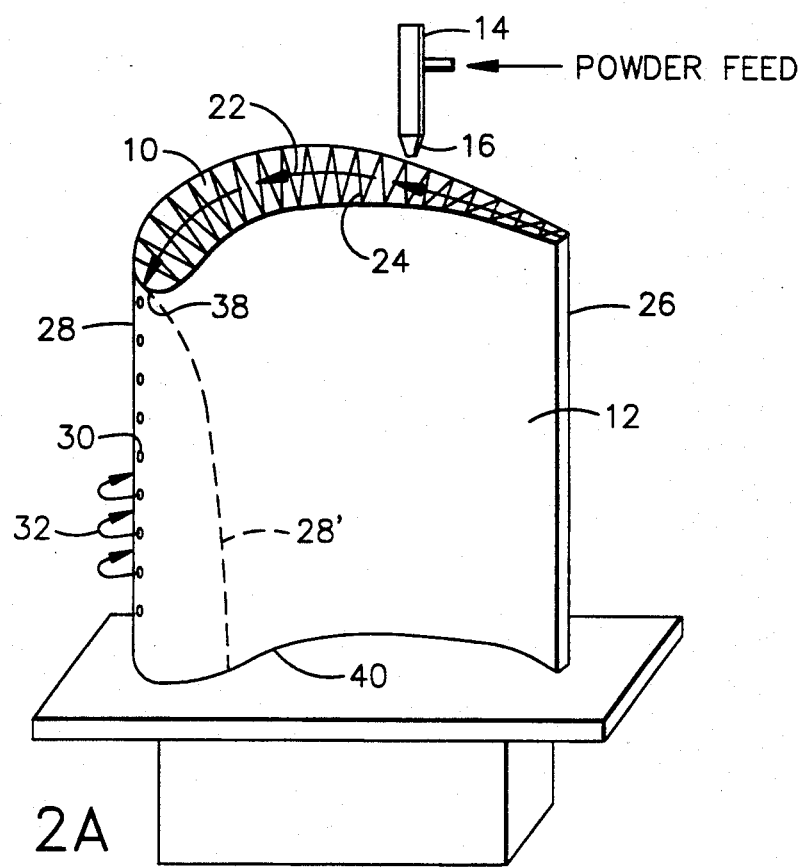
FIG. 2A is a perspective view of a gas turbine engine airfoil illustrating another prior art method for depositing material on the tip of the airfoil.
Figure 2B:
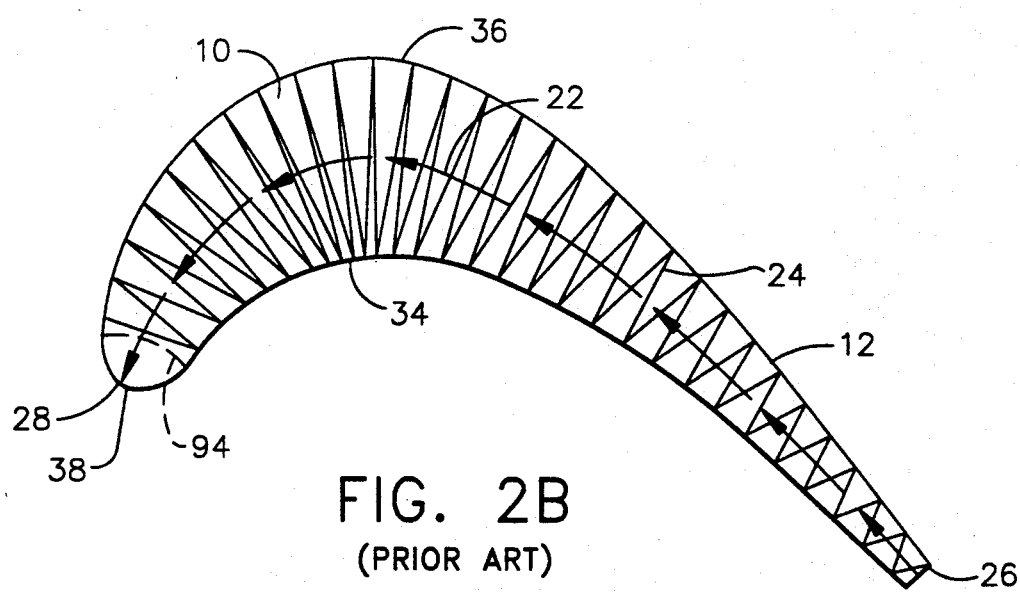
FIG. 2B is a top view of the gas turbine engine airfoil of FIG. 2A.
Figure 4:
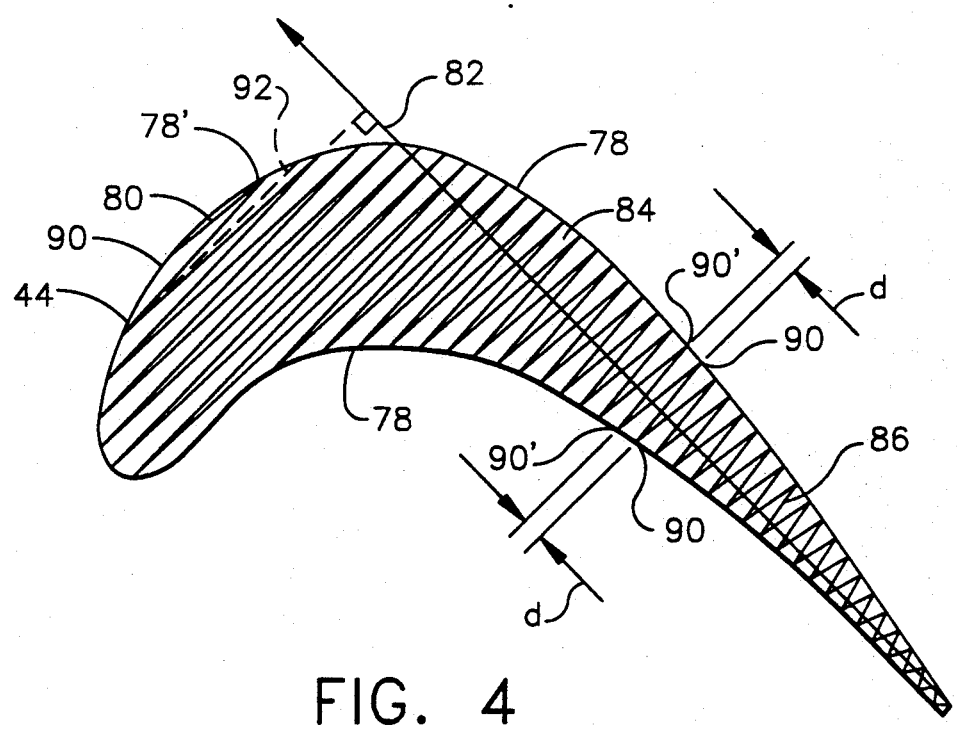
FIG. 4 is a top view of a tip of a gas turbine engine airfoil showing the steps employed in the method of depositing material on the airfoil tip in accordance with the present invention.

Referring now to FIG. 4, in accordance with the method of the present invention, the airfoil 44 is mounted in fixture 42 (FIG. 3) and a linear principal weld path, as indicated by arrow 82, is selected across the tip 84 of airfoil 44. The linear principal weld path 82 is selected to correspond substantially to a longest linear dimension of the airfoil tip, as opposed to a curved principal weld path which substantially follows the contour of the airfoil as shown in FIG. 2B. The linear principal weld path 82 provides substantially uniform propagation of a heat front, caused by the laser welding or other means of welding that may be used, across the longest linear dimension of airfoil tip 84 to utilize substantially a maximum amount of airfoil material as a heat sink and thereby minimize the potential for damage to the airfoil 44.

After selecting the linear principal weld path 82, a weld bead stitch pattern 86 is selected to substantially completely cover the airfoil tip 84. The stitch pattern 86 crisscrosses the linear principal weld path 82 at substantially right angles thereto between opposite edges 78 of the airfoil 44 with the subsequent stitches advancing across airfoil tip 84 in the direction of the linear principal weld path 82. The stitch pattern 86 of FIG. 4 is shown to be substantially more expanded than in actuality for purposes of convenience and explanation. The points 90 and 90' at which adjacent weld beads intersect the same edge 78 of airfoil tip 84 are preferably at about equal distances d for each stitch of stitch pattern 86. The distance d will be dependent upon the width of the weld bead and may be about 0.02" to about 0.05" for a weld bead width of about 0.1". This should provide layer of tip material with a uniform height or width across the entire area of airfoil tip 86 while minimizing the creation of voids between adjacent stitches. With a distance d of about 0.02" to about 0.05", each stitch of stitch pattern 86 will cross principal weld path 82 at substantially a right angle thereto to provide substantially uniform heat front propagation along the longest straight dimension of airfoil tip 84 to utilize substantially the maximum amount of airfoil parent material for heat sink purposes. For example, as weld bead stitch pattern 86 approaches one end 90 of airfoil tip 84, to finish depositing a layer of tip material, the heat front area will be substantially that area enclosed by the airfoil edge 78' and broken line 92. This is substantially more area for heat sink purposes than compared to the area in FIG. 2B bounded by leading edge 28 and broken line 94. Thus, there is a greater tendency that the leading edge 28 (FIG. 2B) may be damaged or melted down by the heat generated from the welding along the curved principal weld path 22 of the prior art method described with reference to FIG. 2B.

Additionally, because the distance between adjacent stitches 80 of stitch pattern 86 are uniform and controlled as opposed to a more random stitch pattern caused by following a curved principal weld path which corresponds substantially to the contour of the airfoil tip, a layer of tip material can be deposited which substantially follows the contour or near-net shape of the airfoil and thereby reduces the number of unusable airfoils or airfoils that must require additional process steps, such as grinding or deposition of additional material to fill voids or the like. Thus, the present invention provides better control over the deposition of tip material to provide a tip which substantially corresponds to the near-net shape a the airfoil contour and provides uniform propagation of the heat front over a larger area of the airfoil to prevent heat damage to the airfoil during laser welding.

In accordance with the present invention, the software of CNC controller 70 includes provisions to provide a selected dwell or pause duration of the stitch pattern 86 at the opposite edges 78 of airfoil 44 to provide a uniform layer of tip material and to prevent slopping of the weld beam toward the center of airfoil tip 84. The dwell also ensures that sufficient material is deposited at the airfoil edges 78 to provide continuity of the contoured surface between the parent airfoil material and the deposited tip material, and the dwell further ensures that the parent material at airfoil edges 78 are fully consumed or fused into the deposited weld material to prevent voids and ensure adequate adhesion of the deposited tip material.

Figure 5A:
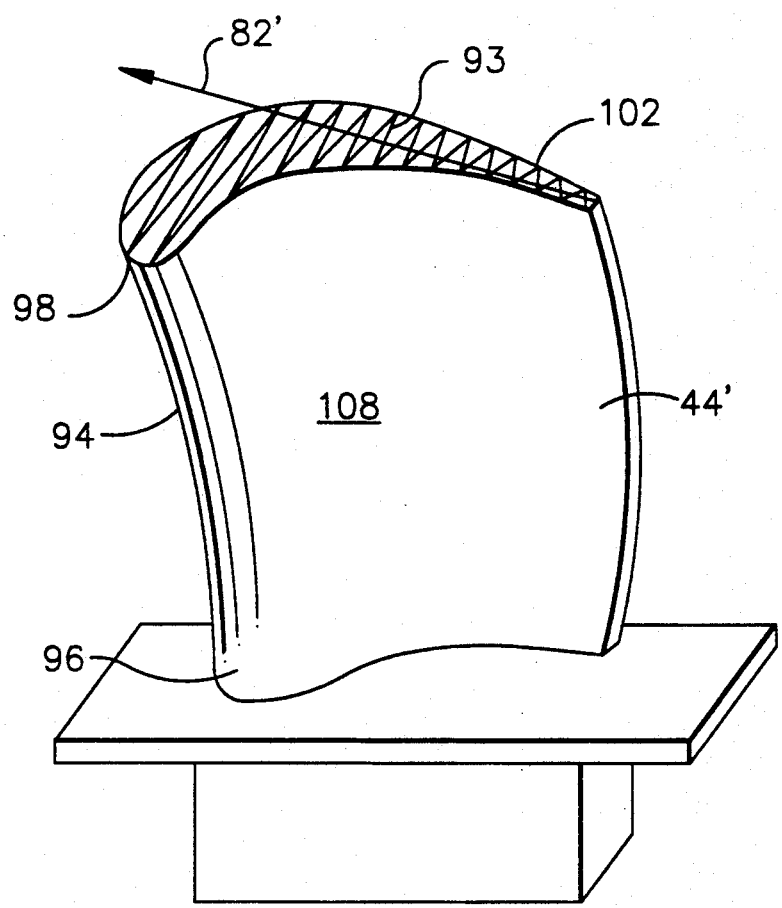
FIG. 5A illustrates the deposition of material, in accordance with the present invention, on the tip of a gas turbine engine airfoil having a complex geometric shape.
Figure 5B:
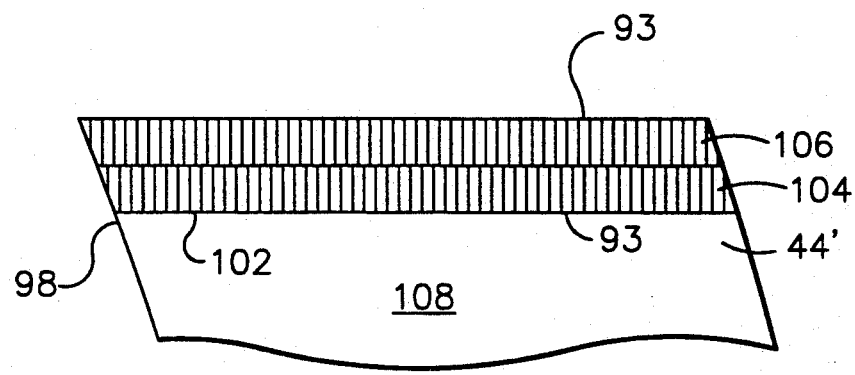
FIG. 5B is a side elevation view of the complex airfoil shape of FIG. 5A.

Referring now to FIGS. 5A and 5B, the method of the present invention permits deposition of tip material 93 on complex airfoil shapes such as those where the airfoil leading edge 94 slopes outwardly from the airfoil root 96 toward the tip 98 of leading edge 94 such that leading edge tip 98 actually extends outward over the remainder of the leading edge 94. Following a substantially linear principal weld path 82' facilitates the deposition of tip material 93 across the surface of airfoil tip 102 and deposition of material 93 which extends out over leading edge tip 98. As best shown in FIG. 5B, multiple layers, as illustrated by layers 104 and 106, of tip material 93 may be deposited on the surface of the airfoil tip 102 with each subsequent layer being stepped or started in a position which is offset form a starting position of the previously deposited layer to provide a build-up of tip material 93 which extends outwardly over leading edge tip 98 and thereby continues the contour of the airfoil as the tip is built up. Thus, the deposited airfoil tip material 93 is substantially continuous and integrally formed with the side surfaces 108 of the airfoil 44'.

While the present invention has been described with a principal weld path advancing from the trailing edge to the leading edge, depending upon the construction of the airfoil and the interior passages or baffles for airfoil cooling, the heat sink characteristics of the airfoil construction may dictate that the linear principal weld path advance from the leading edge to the trailing edge.

It will be readily understood by those skilled in the art that the present invention is not limited to the specific embodiment described and illustrated herein. Different embodiments and illustrations besides those shown herein and described, as well as variations, modifications and equivalent arrangements will now be apparent or will be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for depositing material on a tip of a gas turbine engine airfoil, comprising the steps of:
    (a) selecting a linear principal weld path across the airfoil tip relative to an airfoil contour at the tip, wherein the linear principal weld path is selected to correspond substantially to a longest linear dimension of the airfoil tip to cause substantially uniform propagation of a heat front, caused by the welding, across the longest linear dimension of the airfoil tip to utilize substantially a maximum amount of airfoil material as a heat sink;
    (b) selecting a weld bead stitch pattern to substantially completely cover the airfoil tip, the stitch pattern crisscrossing the linear principal weld path between opposite edges of the airfoil and advancing across the airfoil in the direction of the linear principal weld path; and
    (c) depositing at least a first layer of tip material corresponding to the weld bead stitch pattern and the linear principal weld path by welding.

2. The method of claim 1, wherein step (c) comprises the step of depositing the at least first layer of tip material by laser welding with a laser welding apparatus with a nozzle for concentrically feeding a powdered material around the laser beam.

3. The method of claim 2, further comprising the step of selecting a group of laser welding parameters.

4. The method of claim 3, further comprising the step of selecting a laser power as a function of tip material, airfoil material and airfoil heat sink properties.

5. The method of claim 3, further comprising the step of selecting a focus spot size of the laser beam to determine a width of the weld bead stitch.

6. The method of claim 3, further comprising the step of selecting the powder feed rate as a function of laser power density and a tip material deposition rate.

7. The method of claim 1, further comprising the step of selecting a laser welding dwell time at each of the airfoil edges to deposit sufficient tip material at each airfoil edge to provide an airfoil tip which is substantially continuous and integral with a side surface of the airfoil.

8. The method of claim 1, further comprising the step of depositing at least one second layer which is started in a position offset from a start position of the at least one first position to provide an airfoil tip which substantially corresponds to a contour of the airfoil.

9. The method of claim 1, wherein the powdered material is a metal.

10. The method of claim 1, wherein the powdered material is a ceramic.

11. A method for depositing material on a tip of a gas turbine engine airfoil, comprising the steps of;
    (a) selecting a linear principal weld path across the airfoil tip relative to an airfoil contour at the tip, the weld path being selected to correspond substantially to a longest linear dimension of the airfoil tip;
    (b) selecting a weld bead stitch pattern to substantially completely cover the airfoil tip, the stitch pattern crisscrossing the linear principal weld path at substantially right angles thereto and between opposite edges of the airfoil and advancing across the airfoil in the direction of the linear principal weld path;
    (c) selecting a welding dwell time at each of the airfoil edges to cause deposition of sufficient tip material at each airfoil edge to provide an airfoil tip which has a uniform thickness and is substantially continuous and integral with a side surface of the airfoil; and
    (d) depositing at least a first layer of tip material corresponding to the weld bead stitch pattern and the linear principal weld path by welding.

12. The method of claim 11, wherein step (d) comprises the step of depositing the at least first layer by laser welding with a laser welding apparatus with a nozzle for concentrically feeding a powdered material around the laser beam.

13. The method of claim 11, further comprising the step of depositing at least one second layer which is started in a position offset from a start position of the at least one first position to provide an airfoil tip which substantially corresponds to a contour of the airfoil.

* * * * *